United States Patent
O'Sullivan et al.

(10) Patent No.: US 8,565,401 B2
(45) Date of Patent: *Oct. 22, 2013

(54) HIERARCHICAL CONTROL OF TELECONFERENCES

(75) Inventors: Patrick J. O'Sullivan, Dublin (IE); Edith H. Stern, Yorktown Heights, NY (US); Robert C. Weir, Westford, MA (US); Barry E. Willner, Briarcliff Manor, NY (US); Marjorie R. Willner, Briarcliff Manor, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,370

(22) Filed: Jun. 13, 2012

(65) Prior Publication Data

US 2012/0250846 A1    Oct. 4, 2012

Related U.S. Application Data

(63) Continuation of application No. 12/037,553, filed on Feb. 26, 2008, now Pat. No. 8,275,108.

(51) Int. Cl.
*H04M 3/42* (2006.01)
*H04M 11/00* (2006.01)
*H04M 1/00* (2006.01)
*H04L 12/16* (2006.01)

(52) U.S. Cl.
USPC ............... 379/202.01; 379/93.21; 379/158; 370/260; 455/416

(58) Field of Classification Search
USPC ............... 379/90.01, 93.01, 93.21, 157, 158, 379/201.01, 202.01, 207.01; 370/259, 260, 370/261, 262; 455/414.1, 416
See application file for complete search history.

(56) References Cited

U.S. PATENT DOCUMENTS

| | | | |
|---|---|---|---|
| 5,916,302 A | 6/1999 | Dunn et al. | |
| 6,839,417 B2 * | 1/2005 | Weisman et al. | 379/204.01 |
| 6,915,331 B2 | 7/2005 | Fuller et al. | |
| 6,978,002 B1 | 12/2005 | Cope et al. | |

(Continued)

OTHER PUBLICATIONS

Microsoft Eyes Future of Teleconferencing with RoundTable; Microsoft.com/Presspass; Oct. 20, 2006; Microsoft Corporation; Redmond, WA.

*Primary Examiner* — Khai N Nguyen
(74) *Attorney, Agent, or Firm* — Hamilton, Brook, Smith & Reynolds, PC

(57) ABSTRACT

A teleconference between at least two participants is evaluated by monitoring the teleconference and detecting a triggering event if more than one participant desires to speak at the same time. Upon detecting a triggering event, e.g., detecting an attempt of one or more participants to interrupt another participant, or detecting a request initiated by one or more participants to interrupt another participant, a dominant source is selected from among the ones of the participants attempting/requesting to speak based at least in part upon a determined hierarchical order of those participants attempting/requesting to speak. A participant is then selected from among the participants to have the role of the dominant participant based upon the selected dominant source and only the speech of the dominant participant is conveyed to each participant through the teleconference system.

15 Claims, 6 Drawing Sheets

(56) References Cited

U.S. PATENT DOCUMENTS

| | | |
|---|---|---|
| 6,990,081 B2 | 1/2006 | Schaefer et al. |
| 7,099,448 B1 | 8/2006 | Laniepce et al. |
| 7,149,298 B2 | 12/2006 | Fernandes et al. |
| 7,230,639 B2 | 6/2007 | Ferren et al. |
| 7,277,697 B2 | 10/2007 | Desai et al. |
| 7,765,257 B2 * | 7/2010 | Chen et al. .................... 709/204 |
| 8,275,108 B2 | 9/2012 | O'Sullivan et al. |
| 2004/0047461 A1 | 3/2004 | Weisman et al. |
| 2004/0107255 A1 | 6/2004 | Ludwig et al. |
| 2004/0125933 A1 * | 7/2004 | Jun et al. .................. 379/202.01 |
| 2007/0121872 A1 | 5/2007 | Hans et al. |
| 2007/0172047 A1 * | 7/2007 | Coughlan et al. ........ 379/202.01 |
| 2007/0242129 A1 | 10/2007 | Ferren et al. |
| 2008/0159177 A1 | 7/2008 | Balachandran et al. |
| 2009/0214016 A1 | 8/2009 | O'Sullivan et al. |

\* cited by examiner tion if a triggering event is detected based upon monitoring at least one teleconference parameter by determining a hierarchal hierarchical order of the participants of the teleconference, e.g., by consulting a hierarchy, modifying the participation state of at least one participant based at least in part upon the hierarchical order of the participants and conveying at least the modified participation state information to the corresponding teleconference system so as to implement the participation state of each participant on the teleconference system.

HIERARCHICAL CONTROL OF TELECONFERENCES

RELATED APPLICATIONS

This application is a continuation of U.S. application Ser. No. 12/037,553, filed Feb. 26, 2008, which issued as U.S. Pat. No. 8,275,108, the contents of which are herein incorporated by reference.

BACKGROUND OF THE INVENTION

The present invention relates to systems, methods and computer program products for the implementation of hierarchical control of teleconferences:

Telephony systems are commonly utilized to facilitate conversations between participants. However, such conversations may become unproductive or disruptive, such as where the conversation is over-run with multiple simultaneous voices. This problem is compounded as the number of participants in the conversation is increased. Moreover, when multiple participants are involved in a conference, it may be difficult to orchestrate efficient moderation and flow of the conversation. In this regard, conventional teleconference systems are statically configured and require manual intervention, typically leaving control of communication to the discretion of the teleconference participants and/or a teleconference host.

BRIEF SUMMARY OF THE INVENTION

According to aspects of the present invention, a method of controlling teleconferences comprises evaluating a teleconference between at least two participants by monitoring the teleconference and detecting a triggering event if more than one participant desires to speak at the same time. Upon detecting a triggering event, e.g., detecting an attempt of one or more participants to interrupt another participant, or detecting a request initiated by one or more participants to interrupt another participant, a dominant source is selected from among the ones of the participants attempting/requesting to speak based at least in part upon a determined hierarchical order of those participants attempting/requesting to speak. A participant is then selected from the participants to have the role of the dominant participant based upon the selected dominant source and only the speech of the dominant participant is conveyed to each participant through the teleconference system.

According to further aspects of the present invention, a method of controlling teleconferences conducted between two or more participants comprises assigning a selected one of at least two participation states to each participant in a corresponding teleconference, wherein a first one of the participation states designates a muted state wherein communication from a corresponding participant in the muted state is prevented from reaching the remainder of the teleconference participants over a corresponding teleconference system and a second one of the participation states comprises an active state wherein communication from a corresponding participant in the active state is transmitted to the remainder of the teleconference participants over the corresponding teleconference system.

At least one teleconference parameter associated with the corresponding teleconference is monitored where each teleconference parameter is related to determining whether control of the teleconference should change and a teleconference update is automatically performed without manual interven-

DETAILED DESCRIPTION OF THE INVENTION

Conventional telephone conferences can often be overrun with multiple voices speaking at the same time. Under such an occurrence, it may be difficult for the teleconference participants to distinguish who the speaker is and/or whether an issue of conversation has been suitably resolved. Such potential for overrun may be disruptive, lead to unproductive conferences and/or unduly increase the time required to cover all subject matter for which the telephone conference was originally intended.

In this regard, the teleconference may be more efficiently handled if a single participant has the ability to speak at designated times of the teleconference. According to various aspects of the present invention, hierarchical control is selectively implemented during a teleconference to establish or assist in establishing, a dominant source. Based upon establishing the dominant source, a corresponding participant may be selected as having a dominant role in the teleconference. Accordingly, communication from a single participant having the dominant role reaches the remainder of the teleconference participants across the teleconference system during corresponding designated times where hierarchical control is implemented.

In addition, participants may assume different levels of involvement during a corresponding teleconference. As such, the hierarchical positioning of participants may change during a corresponding teleconference, thus dynamically affecting the criteria utilized to establish a dominant source according to various aspects of the present invention.

Figure 1:
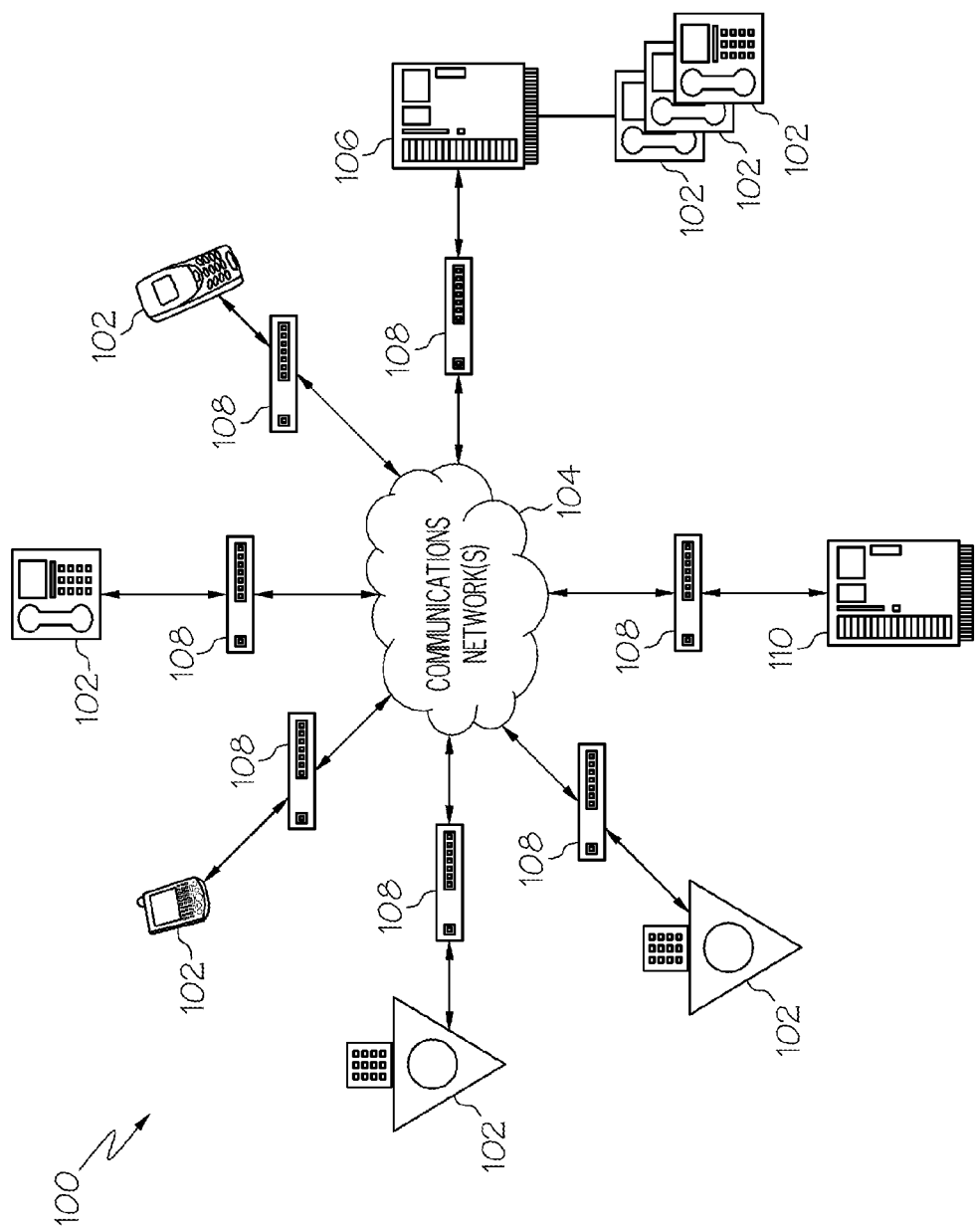
FIG. 1 is a schematic illustration of various devices for connecting to a teleconferencing system according to various aspects of the present invention.

Referring now to the drawings and particularly to FIG. 1, a general diagram of a system 100 is illustrated, which may be utilized to allow participants to implement teleconferencing according to various aspects of the present invention. The system 100 comprises a plurality of communications devices, designated generally by the reference 102 that are linked together by a network 104 when such devices are utilized to participate in a teleconference. Typical communications devices 102 may include traditional wired and wireless telephones, cellular telephones, pervasive computing devices such as smartphones, personal data assistants (PDA) with cellular capability, speaker/intercom based conferencing telephones, etc. Additionally, communications device 102 may communicate with a corresponding teleconference system via a computer or server based telephony systems 106, such voice over internet protocol (VoIP) systems or other types of systems that are capable of utilizing packet based networks for voice communication.

The network 104 provides communications links between the various communications devices 102 and may include for example, a common carrier or telephone company system such as the Public Switched Telephone Network (PSTN), Private Branch Exchange (PBX) systems, Key systems, and other exchanges capable of interfacing with the PSTN. The network 104 may also integrate prevailing technologies such as Integrated Services Digital Network (ISDN) systems, short message service (SMS) systems, code division multiple access (CDMA) systems, Universal Mobile Telecommunications System (UMTS), cellular phone technology such as the Global System for Mobile Communications (GSM), General Packet Radio Service (GPRS), etc.

Still further, the network 104 may include data networks, such as one or more intranets, extranets, local area networks (LAN), wide area networks (WAN), wireless networks (WIFI), the Internet, including the World Wide Web, and/or other arrangements for enabling or controlling communication between the communications devices 102 during a teleconference. Various aspects of the present invention may require the manipulation of data other than the voice communications associated with the exchange from the participants of a corresponding telecommunication. For example, hierarchical data is collected and evaluated according to various aspects of the present invention. In this regard, data transmissions need not be routed along the same end-to-end connections utilized to facilitate voice communications between participants of the teleconference.

As noted above, parts of the network 104 utilized to implement a teleconference may be physically and/or logically external to the PSTN. As such, the network 104 may be supported by components 108 that interconnect the communications devices 102, including for example, adapters, conferencing bridges, VoIP PBX systems, routers, wired or wireless communications links and corresponding interconnections. A teleconference system 110, illustrated as a teleconference server, may also be provided to facilitate teleconferencing and to selectively implement hierarchical control over corresponding teleconferences as will be described in greater detail herein.

The system 100 is shown by way of illustration, and not by way of limitation, as an environment in which various aspects of the present invention may be practiced. In this regard, various aspects of the present invention may be practiced as an enhanced service in the telephone network, mainly computer and IP based, e.g., with VoIP or by utilizing a hybrid of computer and telephony integration.

Figure 2:
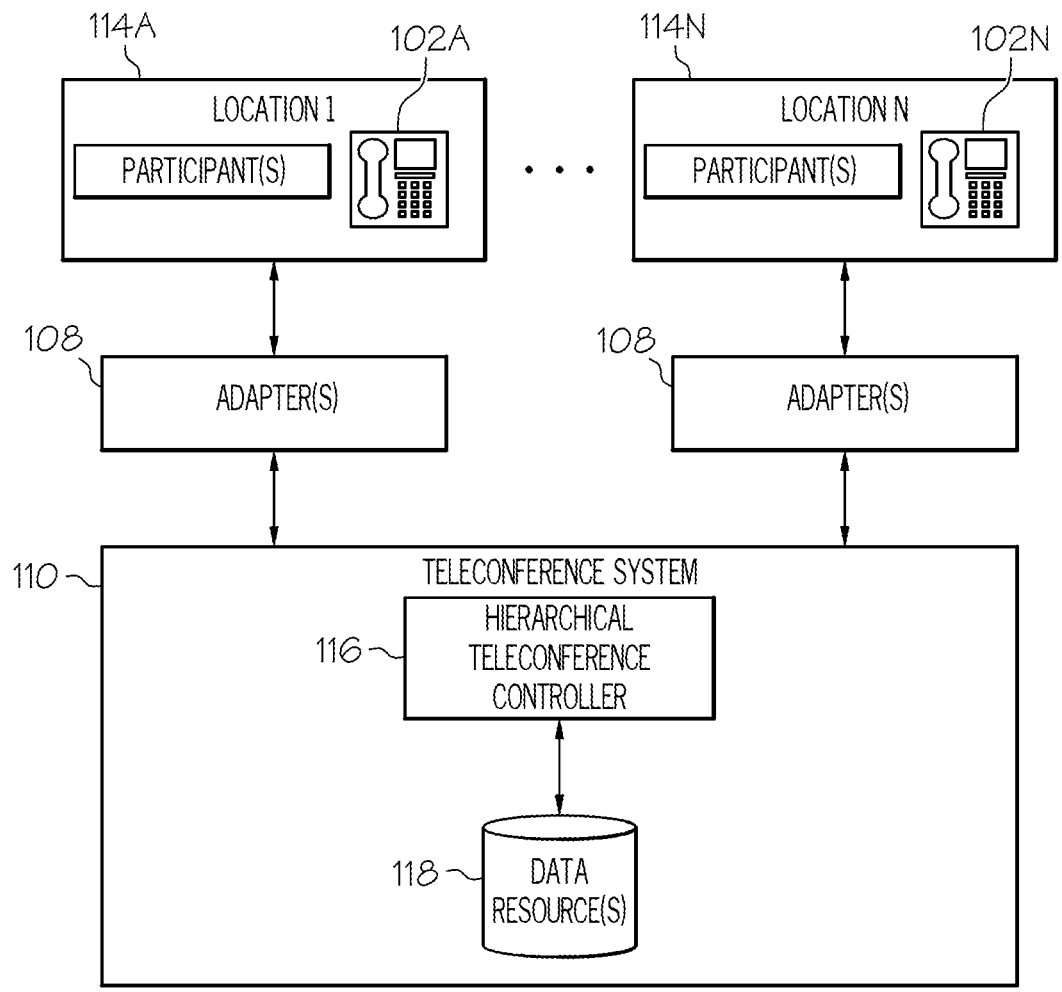
FIG. 2 is a block diagram of a telecommunications system according to various aspects of the present invention.

Referring to FIG. 2, participants at N distinct physical locations 114A-114N may connect to the teleconference system 110 to carry out a corresponding scheduled teleconference, where N is an integer greater than 1. Each connection temporarily ties an associated one of the communications devices 102A-102N into the corresponding teleconference, e.g., for as long as the associated participant maintains their connection with the teleconference system 110. The telecommunications system 110 thus enables the participants, who may be geographically remote from one another, to converse as if connected to a party line. Depending upon the particular implementation, the connection from one or more of the communications devices 102A-102N may pass through a component 108, such as an adapter, e.g., bridge, exchange, etc. as described with reference to FIG. 1.

According to various aspects of the present invention, the telecommunications system 110 includes a hierarchical teleconference controller 116 and corresponding data source(s) 118. The hierarchical teleconference controller 116 and corresponding data determine a dominant source among the participants based upon an established hierarchy of participants when hierarchical control is active such that communications from the participant associated with the dominant source reaches the remainder of the participants over the corresponding teleconference system 110. All other participants may be either muted or they may be otherwise subservient to the dominant source, thus enabling a single voice at a time to communicate with other participants of the teleconference.

As an example, the hierarchical teleconference controller 116 may evaluate a teleconference by monitoring the participant communications and by detecting a triggering event if more than one participant is attempting to speak at the same time. Upon detecting a triggering event, the hierarchical teleconference controller 116 may select a dominant source from among the participants who were attempting to speak at the same time. The selection of the dominant source is based at least in part upon a hierarchical order of those participants attempting to speak, where the hierarchical order is determined from information stored in the corresponding data source(s) 118. A participant is then selected from the participants to have the role of the dominant participant based upon the selected dominant source and only the speech of the dominant participant is conveyed to each participant through the teleconference system.

Figure 3:
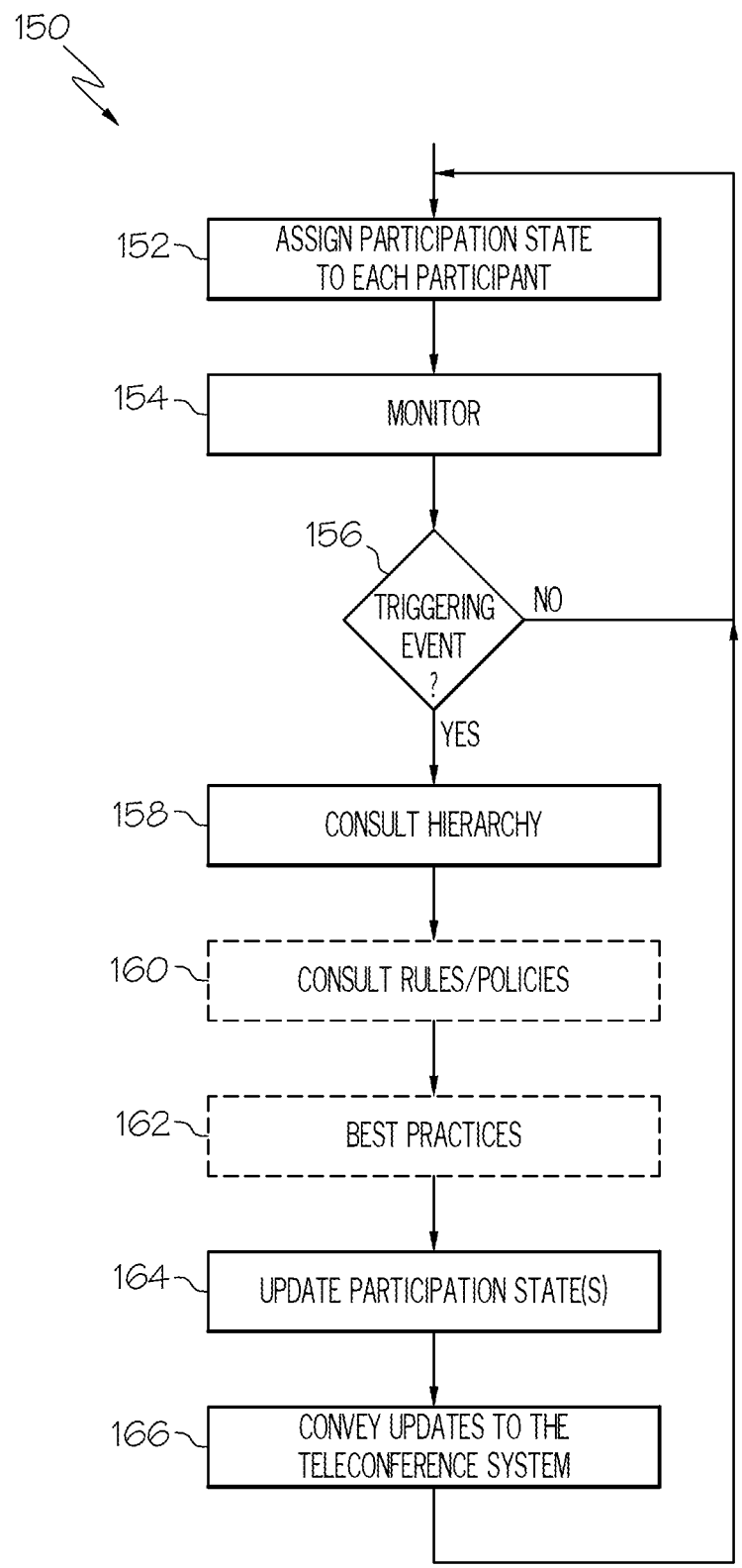
FIG. 3 is a flow chart illustrating a method of providing hierarchical control of a teleconference system according to various aspects of the present invention.

Referring to FIG. 3, a method 150 for controlling teleconferences conducted between two or more participants is illustrated. The method may be implemented, for example, by the hierarchical teleconference controller 116 and corresponding data source(s) 118 described with reference to FIG. 2. To control a teleconference, a selected one of at least two participation states is assigned to each participant of a corresponding teleconference at 152. For example, according to various aspects of the present invention, a first participation state may be designated a "muted state" wherein communication from a corresponding participant in the muted state is prevented from reaching the remainder of the teleconference participants over the corresponding teleconference system. A second participation state may be designated an "active state" wherein communication from a corresponding participant in the active state is transmitted to the remainder of the teleconference participants over the corresponding teleconference system.

In this regard, the teleconference states may provide a logical means to organize the participants of a corresponding teleconference and the role that each participant plays during a given portion of the corresponding teleconference, and may thus be implemented conceptually or logically in practice.

During the teleconference, at least one teleconference parameter is monitored at 154 where each teleconference parameter is related to determining whether control of the teleconference should change If a triggering event is detected at 156 based upon monitoring at least one teleconference parameter, a teleconference update is performed. In this regard, the update may be determined and/or implemented automatically and without manual intervention of a teleconference participant. Teleconference updates are performed by consulting a hierarchy of participants at 158 to determine a hierarchical order of the participants of the teleconference. Other optional considerations may include consulting rules/policies at 160 and/or a designation of best practices at 162, as will be described more fully herein.

The participation state of at least one participant is modified at 164 based at least in part upon the hierarchical order of the participants and the modified participation state information is conveyed to the corresponding teleconference system at 166 so as to implement the participation state of each participant on the teleconference system.

Figure 4:
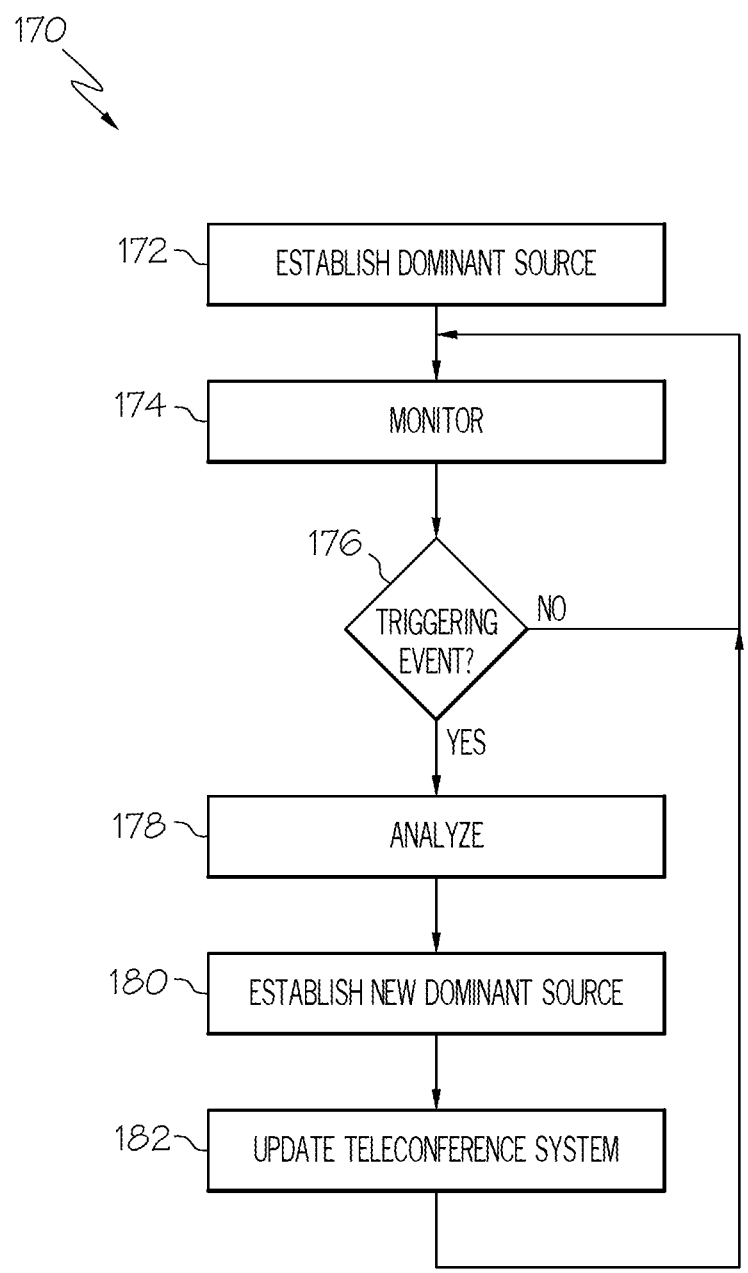
FIG. 4 is a flow chart illustrating a method of establishing a dominant source in a teleconference according to various aspects of the present invention.

Referring to FIG. 4, at one or more times during a teleconference, it may be desirable to limit the communications transmitted across the teleconference system 110 to a single dominant participant. In this regard, the dominant participant is also the only participant in the active state. The remaining participants are in the muted state.

A method 170 illustrates an approach to providing control based upon identifying a dominant source and associating the dominant participant based upon that dominant source. A dominant participant is established at 172 and the teleconference system is configured such that only the communications of the dominant participant is transmitted to the remainder of the teleconference participants over the corresponding teleconference system. The teleconference is monitored at 174 and if a triggering event is detected at 176, then an analysis is performed at 178 to determine whether a new dominant participant should be identified.

As an illustrative example, the triggering event at 176 may comprise detecting multiple incoming voices in the various connections to the teleconference system 110. In this regard, a first participant may be attempting to interrupt the current dominant participant. As another example, one or more participants may communicate a request for the right to interrupt or otherwise gain access to the right to speak, such as by sending a non-voice based request using either the phone system or other data communications system, examples of which will be described in greater detail herein. The analysis at 178 determines which of the incoming communications is the dominant source, and may thus determine whether the role of dominant participant should be relinquished. The analysis at 178 may conclude to reassign the role of dominant participant for example, if the interrupting participant is situated higher in a current hierarchy relative to the current dominant participant.

If a new dominant source is determined, then the participant associated with the dominant source is established as the dominant participant at 180 and the teleconference system is updated at 182 such that the new dominant source is the only voice that is transmitted to the remainder of the teleconference participants over the corresponding teleconference system.

Figure 5:
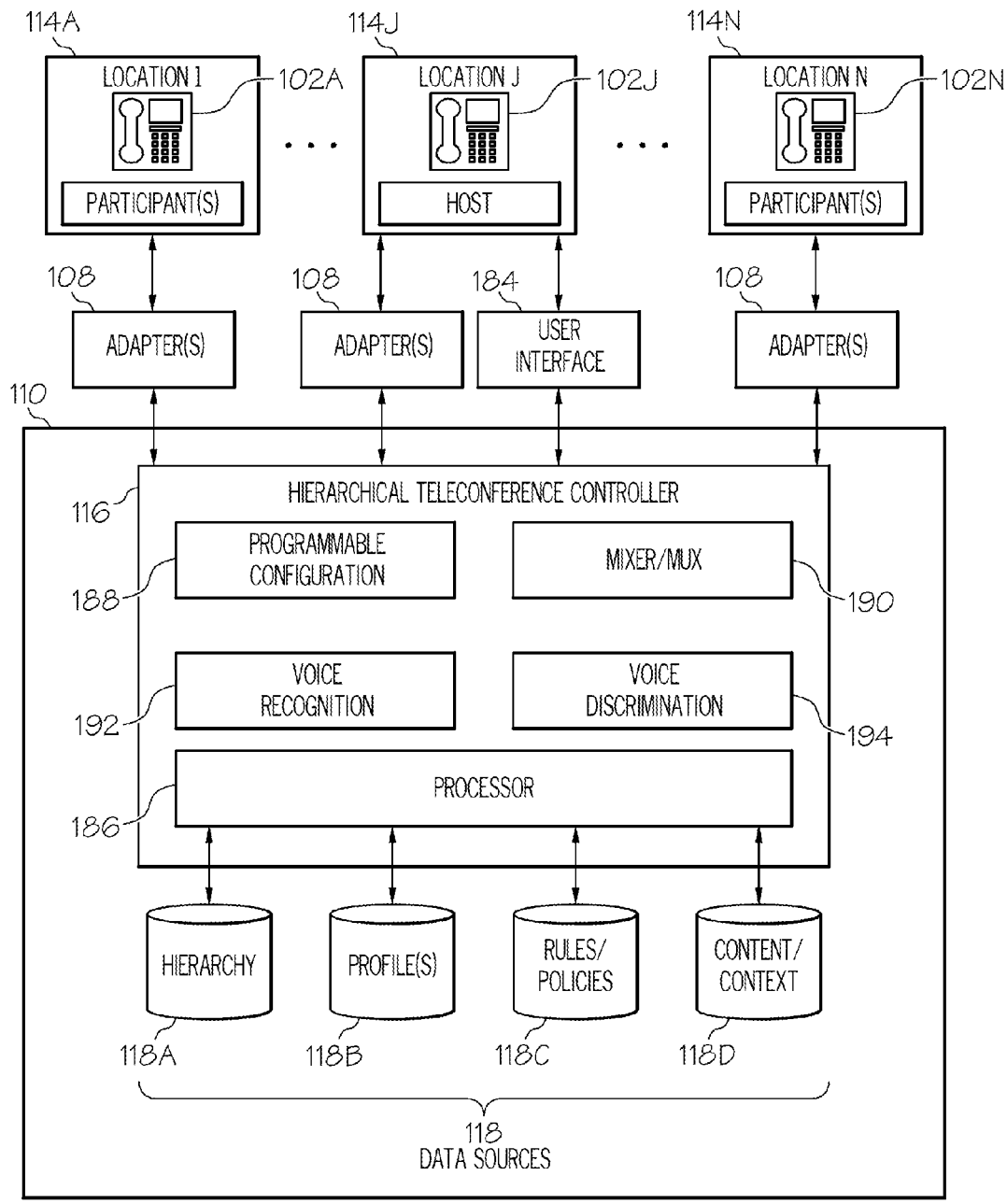
FIG. 5 is a system diagram of a teleconference system capable of implementing hierarchical control according to various aspects of the present invention.

Referring to FIG. 5, the teleconference system of FIG. 2 is illustrated in greater detail according to various aspects of the present invention. In a manner analogous to that described above with reference to FIG. 2, a plurality of locations 114A-114N may connect to the teleconference system 110. Each connection temporarily ties an associated one of the communications devices 102A-102N into the corresponding teleconference, e.g., for as long as the associated participant maintains their connection with the teleconference system 110. Also as shown, each connection may optionally couple through one or more components 108 such as adapters, exchanges, etc. as described more fully herein.

Also, one of the participants, e.g., a participant at location 114J in the present example, may also serve the role as the host or initiator of the teleconference. Under this arrangement, the host may utilize a user interface 184 or other hardware or software tools to set up and/or control the flow of a corresponding teleconference, such as by establishing one or more hierarchies, identifying participants and/or participant profiles, establishing/selecting appropriate rules and/or policies and performing other operations to control the flow during the teleconference, such as by assigning or otherwise delegating participant state information, etc. Moreover, the host may utilize the user interface 184 to steer the teleconference in real-time or near real-time. The user interface 184 may be computer based and thus provide a visual/graphical interface to the teleconference system 110. The user interface 184 may also be telephony based, e.g., which includes a telephony interface that allows for the use of spoken menus, keypad or voice recognition input, etc. Still further, the user interface 184 may be implemented using a combination of telephony based and computer based interfaces to the teleconference system 110.

As shown, the data source 118 has been conceptually divided into a plurality of different data types to facilitate discussion herein. As shown, the data types include hierarchy data 118A, profile data 118B, rules/policies data 118C and content/context data 118D. The hierarchy data 118A may store hierarchy information used, for example, to establish priority for participants who want to assume the dominant participant role. The profile data 118B may store a profile of one or more of the participants of the teleconference. The profiles may be used to construct a hierarchy (dynamically at runtime or prior to the teleconference) or to otherwise provide parameters to be evaluated during the teleconference in cooperation with the hierarchy.

The rules/policies data 118C may provide rules and/or policies that are consulted and interpreted in determining control of a corresponding teleconference. For example, rules and/or policies may establish the dominant source among incoming communications. Rules may also establish when or if the state of a participant should change. The content/context data 118D may be utilized to store information that allows the teleconference system to make automatic decisions. For example, the content of the teleconference may be broken down into portions of the teleconference. An agenda with scheduled times allotted to each portion may be stored as content/context data 118D to assist in automated decision making. Moreover, as a further example, contextual information, such as the subject matter of each portion of the teleconference may be stored. This contextual information may be used in lieu of or in combination with participant profile information to make teleconference control decisions, construct hierarchies, etc.

The controller 116 may include a processor module 186 that utilizes the information stored in the various data sources 118 to assist in making determinations directed to the control of the corresponding teleconference. A programmable configuration module 188 may also be provided for setting up the parameters necessary to control the teleconference, including defining parameters utilized to make decisions based upon monitoring the teleconference. For example, the host at location 114J may log into the telecommunications system 110, e.g., via the user interface 184 to preprogram the control of an upcoming teleconference by interacting with the programmable configuration module 188 to define or otherwise identify profiles, hierarchies, rules, policies, content data, context data, etc. The configuration module 188 may also serve as a means for the host to make changes to the control of a teleconference while being carried out.

A mixer/multiplexer (mux) module 190 may be provided for tying the incoming lines of the various participants during the teleconference, and for implementing the various participant states when appropriate, such as by interacting with the various communications devices 102A-102N, components 108 such as adapters, exchanges, etc., and other devices that control the voice portion of the teleconference across the network 104. The mixer/mux 190 may thus handle switching, mixing, multiplexing and other related aspects of the teleconference. In this regard, the mixer/mux 190 may also be carried out entirely in the adapters, switches and other components 108 used to couple the communications devices 102 to the teleconference system 110.

The telecommunication system 110 may also include a voice recognition module 192 and may further include a voice discrimination module 194. The voice recognition and/or the voice discrimination modules 192, 194 may be utilized by the processor module 186 to make automated decisions to control of a corresponding teleconference, such as to identify a dominant source from among incoming signals to the teleconference system 110. The various modules 188, 190, 192, 194 of the teleconference system 110 may thus cooperate with the data sources 118 to implement hierarchical control of corresponding teleconferences including implementing the methods described with reference to FIGS. 3 and 4, herein.

Referring to the Figures generally, the selection of the participation state for each participant and/or the selection of a dominant source/dominant participant may be implemented in a number of diverse manners.

In an illustrative application, a teleconference may designate three periods where a different designated participant is presenting a topic of interest in each of the three periods, after which, a question and answer period is available. To assist with the control of this flow, a host of the teleconference may utilize the user interface 184 to set up hierarchies of the participants, which may be stored, for example, in the hierarchy data source 118A. In this regard, a different hierarchy may be set up for each period of the teleconference, or a single hierarchy may be dynamically updated and/or derived, such as based upon the profile data 118B, rules/policies data 118C and/or content/context data 118D. Since the first three periods are specified for presentation of topics of interest, the host may designate that the presenter for each period shall be the default or initial dominant participant for their corresponding period. The host may also place the associated presenter at or near the top of the hierarchy for each period.

Also, since this example is for a lecture style presentation, the remainder of the participants may be assigned a participation state of muted. In this state, a rule may specify that muted participants cannot interrupt the speaker, even during pauses or periods of silence. Instead of logically implementing states, the hierarchy may be created to define a class that cannot interrupt under any circumstances. As yet another way of implementing a "no interruption" policy is to couple a hierarchy with a corresponding rule that specifies a minimum hierarchical position before which the participant can interrupt or otherwise speak across the teleconference system.

Alternatively, where interruptions may be tolerated under proper circumstances, the host may assign certain classes of participants, such as a boss or supervisor, team leader, panel expert, etc., to a hierarchical position that enables interruptions or that may otherwise allow such a participant to obtain the role of dominant participant under designated circumstances. For example, the host may retain the right to interrupt the presenter, such as by having the host at a higher position within the hierarchy. A rule may prevent a supervisor from interrupting the presenter during their corresponding presentation period, but may allow the supervisor to assume the dominant participant if the presenter pauses for a predetermined period of time. As another example, a rule may prevent a supervisor from interrupting the presenter during their corresponding presentation period, but may allow the supervisor to interrupt the presenter during a question and answer segment of the presentation. Any number of alternative arrangements may be implemented within the spirit of the various aspects of the present invention.

Keeping with the current example, during each presentation period of the teleconference, the designated presenter will (at least initially) assume the role of dominant participant and communication from the presenter is transmitted to the remainder of the teleconference participants over the corresponding teleconference system, e.g., via the telecommunication system 110 controlling the connections of the participants using appropriate control logic such as the components 108, mixer/mux 190, etc. Moreover, during these three exemplary periods, the non-presenting participants are in the muted state. As such, communication from these corresponding muted participants is prevented from reaching the remainder of the teleconference participants over the corresponding teleconference system. Moreover, if other participants attempt to speak during the teleconference, such as to cause an interruption, they must first be judged as the dominant source before their voice reaches the remainder of the teleconference participants over the corresponding teleconference system. Thus, the teleconference is controlled by allowing only a single dominant voice during these designated periods.

During the question and answer period, the host may modify the hierarchy to that based upon an organizational order. Thus for example, participants may be ranked by organization, e.g., a project manager is higher in the hierarchy as a team leader who is higher in the hierarchy than a team member. The rank of the participants may be stored for example, in the profiles data source 118B. Moreover, rules and/or policies, such as may be stored in the rules/policies data source 118C, may be consulted to establish a rule that the project manager can interrupt any other speaker. Team leaders may be able to interrupt team members but not the project manager, etc.

As a further example, the hierarchy may dynamically change based upon the context of a particular question asked. As an example, a first team leader may be able to interrupt a second team leader during question and answer period if the topic of discussion is directed to the expertise of the first team leader. Such intelligence may be automatically determined based upon profile information for the first and/or second team leaders stored in the profile data 118B and/or content/context data 118D.

As still a further example, the host may assign each presenter in an active state and disable the dominant source requirement. As such, the three presenters can have a free-for-all discussion/debate during a designated period. During which time, all participants in the muted state will be unable to interrupt those in the active state.

The above was presented by way of illustration and not by way of limitation. Numerous other exemplary configurations may be implemented, further examples of which are set out below.

The selection of whether a participant should be in the active or muted state, the selection of the dominant source, the hierarchy, policies and other aspects of the present invention may be dynamic so as to change throughout the flow of the teleconference. As a few illustrative examples, the dominant source may change under program control and/or the dominant source may change dynamically by having the system automatically monitoring the system, e.g., via incoming voice signals into the mixer/mux 190, and by making autonomous decisions as to who should be granted the dominant role based upon a corresponding identification of a dominant source using hierarchical information.

According to various aspects of the present invention, the dominant source is selected based upon a hierarchy of participants, which may be stored, for example, in the hierarchy data source 118A. Conceptually, the hierarchy may change at one or more times during the teleconference. This may be implemented by dynamically updating a hierarchy, such as based upon profile information obtained with regard to each participant. Alternatively, a host may predetermine multiple hierarchies, any one of which may be used at particular times during the corresponding teleconference.

The hierarchy may be established in any suitable manner. As a few illustrative examples, the conference initiator/conference host may specify one or more hierarchies for a corresponding teleconference. A hierarchy may also be established based upon the organization of an entity, based upon a lightweight directory access protocol (LDAP), a BluePages or other directories or membership list(s). The hierarchy may be based upon a directed acyclic graph. Still further, the hierarchy may be based upon a directory tree or other structure that reflects organizational, geographic and/or other boundaries.

The hierarchy may also be constructed, at least in part, upon profiles, e.g., as stored in the profile data 118B. The profile data may contain information about one or more of the participants and include information such as position or title, areas of expertise, affiliations or other relevant information that is deemed to be useful for implementing control of the corresponding teleconference.

Thus, for example, the hierarchical order may be based upon a level of involvement of each participant during the teleconference. For example, a participant may be a supervisor and thus have a relatively high organizational position. However, the subject matter of the teleconference may not be within the supervisor's expertise, or the supervisor may participate only as an observer, e.g., to gain background knowledge. Under this example, the level of involvement of the supervisor is relatively low. Thus, the supervisor may be positioned low in the hierarchy, e.g., via a corresponding rule, profile or hierarchy representation.

Still further, a hierarchy may be specified through one or more rules and/or policies, e.g., stored in the rules/policies data 118C. Such rules and/or policies may be specified by a corresponding organization or sponsor of the teleconference. Rules and/or policies may also be specified based upon individual profiles. Still further, rules/policies may be based upon "best practices", such as rules of order, etiquette, custom, tradition, etc. As a few illustrative examples, a policy may be implemented during a corresponding teleconference based upon cultural/geographic courtesies. In this regard, the sensitivities and tolerances of participants from different geographic/cultural backgrounds may be addressed by rules and/or policies that dictate when a speaking participant may be interrupted, etc. Moreover, different dialects and manners of expression in different cultural/geographic backgrounds may be used to establish a baseline policy as to how long of a pause is required to set a threshold for relinquishing control of the dominant participant, etc. Similarly, policies and/or rules may be set up to address gender issues. For example, it may be desirable in certain contexts to prevent male speakers from interrupting female speakers or vice-versa.

Other exemplary policies/rules may establish associations between and among organizations. For example, a director in the organization of an entity hosting the teleconference my assert priority over a participant who holds the title of vice president of another entity. As yet another example, a customer/participant may be given priority over an employee participant. The above examples were presented by way of illustration and not by way of limitation. Numerous other implementations may be realized, depending for example, upon the particular facts of the teleconference, the participants involved, and the implementation details of the given teleconference system.

Still further, policies may also be applied to specific individuals. For example, if employee A and B often work together, and employee A believes that employee B lacks a expertise or knowledge in a particular subject matter, employee A may specify in their profile that on calls for which employee A is host and the particular subject matter is the topic of discussion, employee B may not interrupt any speaker in progress.

Different policies/rules may also be specified for determining priority of participants to speak when a pause of another participant is occurring. In this regard, different policies and rules may govern who may begin speaking when a pause is occurring, and who may interrupt when a speaker is in progress. Thus, for example, policies may specify the length of time necessary to declare that a pause has exceeded a corresponding designated pause threshold. The duration necessary to designate a pause may be specified once, e.g., based upon a common specified threshold, may be specified by profile e.g., in a corresponding participant profile, may be specified by policy or rule and/or may be dynamic based on points of origin. In some cultures, geographic locations, etc., a pause is shorter than in others. Other parameters may also be utilized to determine an appropriate pause threshold. A user's profile may also/alternatively specify terminating conversation pause length or a designated pause threshold, e.g., how long after they stop speaking until a pause is declared and others may begin speaking. For example, based on a user's style of speech, a longer or shorter pause may be appropriate.

Accordingly, the teleconference system may consult a hierarchy to determine a hierarchical order of the participants and one or more policies or rules that determine whether a first participant can interrupt a designated dominant participant where the designated dominant participant is the only speaker that reaches the remainder of the teleconference participants over the corresponding teleconference system.

The teleconference system may monitor at least one teleconference parameter, such as whether a participant is actively speaking, whether multiple participants are trying to simultaneously speak, etc. The teleconference system may also monitor the duration of a pause of the participant actively speaking. The teleconference system may then automatically perform a teleconference update without manual intervention if a triggering event is detected, e.g., a participant is attempting to interrupt the current speaker. As an example, if another participant begins speaking with hierarchical priority to interrupt the current speaker, then an update may comprise changing the dominant role to the interrupting participant regardless of whether the current speaker is actively speaking or paused. Another example, if another participant begins speaking who has hierarchical priority to speak and the current speaker has paused for an amount of time exceeding a designated pause threshold, then an update may comprise changing the dominant role to the participant that began speaking.

As another example, a supervisor may receive a hierarchy code of 1, meaning that the supervisor can interrupt anytime someone else is speaking. A team leader may receive a hierarchy code of 2, which may give the team leader the ability to speak once group 1 has been speaking for a certain amount of time, the ability to interrupt a participant ranked below code 2 in the hierarchy, etc.

According to various aspects of the present invention, voice recognition may be utilized to control the corresponding teleconference. For example, voice recognition 192, which may include voice recognition hardware/software at the teleconference system server or otherwise distributed across the network 104 and/or within the communications devices 102 may be utilized to identify who is attempting to speak so that the system may determine the dominant source or otherwise control the teleconference.

Thus, as an illustrative example, if there are multiple speakers attempting to communicate to the remainder of the teleconference participants over the corresponding teleconference system, each such speaker may be recognized using the voice recognition 192 and based on organization or other hierarchy the dominant source is chosen by the system. In this regard, voice recognition may not be available for all participants, and voice recognition may not be available at all. As such, voice recognition may be used in combination with other system resources, if implemented at all.

The system may also utilize voice discrimination 194. Voice discrimination 194 may be used in combination with voice recognition 192, such as where multiple voices may be transmitted along a common channel. Such may occur where multiple communications devices are mixed together at a previous stage within the network 104. Alternatively, there may be several participants accessing the teleconference from a single communications device 102. In this regard, more than one actual teleconference participant may be present at each location during the teleconference such that a single physical line may be utilized to carry multiple distinct voices. For example, multiple participants may be in a conference room or may be otherwise participating in the teleconference over a conference or speaker phone. The voice discrimination 194 may be utilized in combination with the voice recognition 192 to distinguish one voice from others.

Thus, as an example, if a vice president (VP) and regular employee are sitting in one office, e.g., at location 114A on a conference line, e.g., via a common communications device 102A, and a director is sitting in another office on a conference line, e.g., at location 114N via communications device 102N, if the VP and the director both speak and the same time, the VPs line may be determined to be the dominant source based upon voice discrimination and/or voice recognition. If the regular employee and the director speak at the same time, the director's line may be judged the dominant source. Moreover, assume the VP is judged to be the dominant source and the VP is currently silent, e.g., where the period is within a pause threshold associated with the VP or where the employee is in the muted state. If the employ speaks at location 114A, then no sound will be communicated to the remainder of the teleconference participants over the corresponding teleconference system as the employee is not the dominant source, despite being on the same physical line/the same location as the VP. However, if the employee is not in the muted state, both the VP and the director are silent and the designated pause threshold has lapsed for both the VP and the director, then the employee may be able to communicate with the director and VP across the teleconference system.

Where voice recognition is unavailable, or where it is unpractical to use voice recognition, such as in a narrow bandwidth and/or low resource environment, then other approaches may be utilized to automatically establish who is attempting to communicate to the remainder of the teleconference participants over the corresponding teleconference system. For example, the teleconference system 110 may associate various lines to a hierarchy, such as by associating phone numbers (lines) with individuals through static look up, based upon information passed during conference join, when each joining conference participant is identified, based upon location, etc.

As yet another example, a participant with sufficient authority, such as the teleconference host, could raise or lower the hierarchical position of a participant during the teleconference itself. For example, the host may utilize the user interface 184 to define the importance of each participant on the call and their ability to speak to the remaining participants across the teleconference system, e.g., by assigning a teleconference state to each participant. This could be statically defined or based on rules and policies. The host may also assign certain participants on the call different speaking abilities, e.g., by positioning such participants at various levels within an associated hierarchy. As an illustrative example, the host may assign a primary speaker a high position in the hierarchy and assign a co-speaker/secondary speaker a lower priority in the hierarchy for a corresponding portion of a teleconference. In this regard, a teleconference update may occur if a triggering event is detected, such as by detecting a desired control change implemented by a designated conference host to reassign the hierarchy among the participants.

According to various aspects of the present invention, the host or other deemed participant may be able to assign all participants, or groups/classes of participants, in the active state wherein the dominant source hierarchical control is disabled. Alternatively, the dominant source may be designated only to those participants in an active state. This may be desired, for example, at the start of a teleconference for greeting and introductions, at the end of the conference for wrap ups or wind down conversations, etc. This may be accomplished, for example, by interaction with the user interface 184 to the teleconference system 110. Additionally, the host may be able to quickly assign all participants or classes/groups of participants to the muted state, in order to answer a question, gain control of the conversation, etc. Again, the states may be implemented logically or conceptually, e.g., via the logic used to define the dominant source itself.

In this regard, a boss, supervisor or other designated participant may also utilize a user interface 184 that would enable selective control, e.g., to mute participants or to assign an active state to groups or classes of participants, such as to answer questions, participate in free-for-all open discussions and brainstorming discussions, etc. Such a designated participant may also have authority to over-ride the hierarchical decisions automatically made by the teleconference system 110. Thus, a participant may be upgraded within the hierarchy e.g., based upon being deemed by another participant, as being integral to a topic being discussed. A participant may also be downgraded, e.g., based upon being deemed detrimental to a topic being discussed.

According to various aspects of the present invention, a participant may designate a desire to interrupt a current speaker such as by sending a suitable signal to the teleconference system as an alternative to speaking. This may be implemented by way of the voice network, e.g., by dialing a predetermined Dual-tone multi-frequency (DTMF) tone. For example, a participant may dial a DTMF tone, such as #99. The corresponding PBX may interface with a corporate directory which in turn establishes the organizational position of the interrupter, e.g., relative to a corresponding cellular ID of the telephone that transmitted the DTMF signal and an employee record, e.g. in a SAP or other suitable system that governs ownership. On receiving such a stimulus it is compared to other stimuli, e.g. other DTMF interruptions, other voice recognition patterns and the dominant hierarchy may thus be automatically nominated and enforced as dominant.

As another example, the teleconference system 110 may store a static list of lines associated with a teleconference, as well as the participants associated with those lines. When a participant enters a predetermined DTMF code, the processor 186 may evaluate such an action as a triggering event and determine whether the requesting participant should be granted the dominant role.

Notably, the above exemplary approaches to request the right to interrupt e.g., an attempt to interrupt by speaking or to request the right to interrupt by issuing a command, may be implemented even where voice recognition is unavailable, not possible, such as for reasons of sound quality, signal degradation or adequate competition for interruption that would render voice recognition impossible due to the plurality of input signals.

Alternatively, a participant may request to interrupt or otherwise become an active speaker by communicating a request across a data network, such as the Internet. In this regard, control signals/requests need not utilize the same lines for voice per se. As yet another illustrative example, each participant in the teleconference may log in with unique login identification (ID). For example, a participant may log into the teleconference system 110 with an employee serial number, or other information that allows the teleconference system to establish the identity of each participant. This identity information may then be utilized by the teleconference system 110 to determine the ability of each participant to participate in the conversation.

Thus, determination of the dominant source may be based upon detection of signals in various forms, e.g., one participant may communicate a desire for the dominant sound by attempting to interrupt using normal voice channels. Such an interruption request may be processed by the voice recognition module 192. Another participant may communicate a desire to interrupt by entering a DTMF tone into the voice system, and yet another participant may communicate a desire to interrupt by sending a data message to the teleconference system 110, e.g., using a data network such as the Internet. Regardless of the manner in which the communication request is issued, each requesting participant is evaluated based at least in part upon their current hierarchical position as described more fully herein.

According to various aspects of the present invention, the teleconference system may also ensure "fairness" in the conversation, such as by implementing one or more fairness rules and/or policies. For example, a policy may be used to determine how much time each participant has had control of the conversation and then attempt to maintain various fairness schemes, such as speak once, balancing of aggregate speaking time by each participant, etc.

According to various aspects of the present invention, there may or may not be feedback to participants of a teleconference, e.g., to designate that the participant is or is not the dominant role. For example, audible cues such as hearing another voice over the corresponding teleconference system may serve as notice that a participant is not the dominant role. A participant may also attempt to communicate using the communications device 102, which may not be heard through the corresponding teleconference system. Alternatively, an audible signal may be transmitted across the teleconference system. For example, an audible cue such as a first tone may be delivered to a participant when that participant is speaking and has the floor, e.g., by providing a brief tone. A second tone may be communicated, e.g., from the teleconference system 110 to a corresponding participant when that participant loses the rights to the dominant source. A third tone may be utilized to designate a situation such that if the associated participant were to begin speaking, they would "take the floor". Still further, an auditory signal may designate who has taken the floor from a participant.

Still further, the teleconference system may respond to queries so that participants may determine who has the floor by a combination of keystrokes, touch tones or other means. Visual indication may also be implemented, e.g., using lights, an alphanumeric display, or graphical display. Still further, in a network environment that permits connection to a teleconference server via data communications as well as audio communication, the dominant role may be displayed on a computer device, along with profiles, hierarchy information and other pertinent information.

According to still further aspects of the present invention, there are a number of factors that can trigger the detection of the dominant source. The automated selection of the dominant source may be based, for example, upon the detection of a conversation or the detection of an assigned dominant party, who may or may not be speaking. In this regard, the selection of a dominant source need not be carried out for the entirety of the conference. Rather, the selection of a dominant source may be implemented for only a selected portion of the teleconference.

For example, the implementation of the dominant source may be initiated at a preset time after the scheduled start of the conference, e.g., by storing appropriate schedule information in the content/context data 118D. The selection of a dominant source may likewise end at a preset time. The selection of a single dominant source may alternatively be implemented throughout the entirety of a teleconference. As noted above, the selection of a dominant source is dynamic and may be started and stopped by participant action, which may be monitored and automatically detected by the teleconference system. In this regard, if a participant exercises control over the selection of the dominant source, that participant may be a host/moderator, the highest ranking participant, a non-participant, a member of a group of participants, any other participant(s), based on rules, configuration or administration.

As yet another illustrative example, the selection of a dominant source may begin when the moderator "officially" starts the conference, such as by a key press, sign in, or other means, such as by utilizing the user interface 184, via voice recognition, speech recognition, etc.

According to various aspects of the present invention, there are numerous ways that the teleconference system may deal with interruptions. For example, a team member is speaking and has the dominant role. A supervisor wants to interject. Because of a superior hierarchical relationship, the supervisor has rights to the dominant role. In this regard, the team member may be simply cut off, e.g., as fast as the electronics can identify and process the new dominant voice. Alternatively, there may be a window of time to finish a thought before losing priority as the dominant source. For example, an audible cue may designate to a participant with the dominant source that they are about to lose that right in a predetermined amount of time.

Thus, as an example, the change of dominant role based on a "higher rank or priority" speaking may happen as fast as the electronics can process or identify the new dominant voice, or be delayed based a set time interval the can be configured, administered or dynamically adjusted. The predetermined delay may also be derived from profile information, from a corresponding policy, or the delay can also be at a break in the speakers sound or some natural break point such as sentence end as is determined by voice recognition and natural language processing. In this regard, voice recognition and natural language understanding may be more or less useful depending on the power of the voice recognition and natural language processing employed. Still further, indication of changeover or impending changeover (of speakers) can be given in any of the manners described more fully herein.

As yet another illustrative example, during a conversation, a supervisor may be speaking and have the dominant role. During the conversation, say three speakers (e.g., team members with lesser priority) attempt to speak up, but are not transmitted to the remainder of the participants over the teleconference system due to the dominant voice being the only allowed speaker. Further, assume the supervisor pauses and a fourth speaker attempts to interject. Under these and other circumstances where priority may be an issue, the teleconference system may use any number of techniques to resolve the flow and control of the teleconference. For example, the first speaker that attempted to interrupt may be given an opportunity to assume the dominant role. The highest hierarchical priority of those attempting to interrupt may receive the first opportunity to assume the dominant role, or all denied requests for the dominant role may simply be disregarded. Other configurations may alternatively be implemented.

Thus, the teleconference system may implement a queue or other mechanism for others to assert a desire to speak, even if another participant has assumed the dominant role. As a few illustrative examples, a request to the teleconference system to acquire the dominant source may be communicated either "in band (heard in the conversation)" or out band (out side the conversation). Thus, for example, voice, touch tones, packet-based requests or other arrangements may be implemented to send a signal to the teleconference system to request the right to speak. Thus, the out band can be auditory or visual or it may be implemented by other techniques, including email, a web portal, and other Internet related communication techniques. Still further, the right to grant such a request may be made by the teleconference system automatically, e.g., based upon the above described rules, policies, hierarchies, etc. Alternatively, such a decision may be implemented in cooperation with feedback from a participant, e.g., a host/moderator, the participant currently holding the dominant source, or other participant.

If the current speaker stops speaking, the "floor" might pass to one of the requesters if no one of higher priority is speaking Moreover, depending upon the facts, the speaker with the dominant source may want to "pass the floor" to one of the requesters or to any other participant, e.g., based upon predetermined criteria, hierarchical decisions implemented by the teleconference system, etc. As such, the teleconference system 110 may be configured to address a number of situational outcomes.

In the case of multiple speakers at the same priority, a policy may establish a race condition, that is, the floor might be given to which ever participant got to a corresponding queue first. Alternatively, a policy may specify that the next speaker should be that participant who has spoken the least, who has spoken most recently, who has spoken least recently, round robin, or other approach. There may be one or multiple time limits. Time limits may be configured, administered or dynamically adjusted per user, per rank or other organization. Upon exceeding the designated time limit, the participant must yield the dominant role, e.g., to someone of the same or lower rank. There can be auditory or visual indication of the time limit. The time limit may also be queried. Other methods may also be utilized to arbitrate and/or delegate the floor for participants wishing to speak, e.g., where such participants have the same or similar hierarchical position.

Thus, a mechanism may be provided to "preliminarily request" the dominant role, request permission from the dominant role, queue up as a participant desiring the dominant role, or take other actions to prioritize those participants wishing to speak.

The teleconference system may also be configured to address the need in certain circumstances for timely interruptions that may otherwise destroy the flow of conversation if left too long. For example, a team member may want to raise a point, but by virtue of priority, never gain the dominant source. By the time that such a participant gains the dominant source, the subject matter may no longer be relevant. Under such a situation, a participant or the teleconference system may raise the priority of a corresponding participant and "grab the floor". The ability for participants to act outside their normally configured hierarchical position can be configured, administered or dynamically changed. However, this aspect is optional and need not be implemented, such as where strict adherence to the rules, policies and/or hierarchy is to be enforced.

Still further, the teleconference system may provide autonomic content/context based reprioritization, e.g., to dynamically control interruptions based upon content and/or context. For example, the intended conversation may be with regard to topic A, and a participant may have a low priority with regard to the subject matter of topic A. This same participant may be an expert in subject matter B. If the context of the conversation shifts to subject matter B, priority may automatically/manually change. According to various aspects of the present invention, all of the parameters may be configured, administered and dynamically driven by rules. Input to these rules can be content or context such as above where the "speaker switch" is at a natural breakpoint. As such, autonomic modification, i.e., where the system automatically determines certain values and inputs them to the rules and functions may be implemented.

Figure 6:
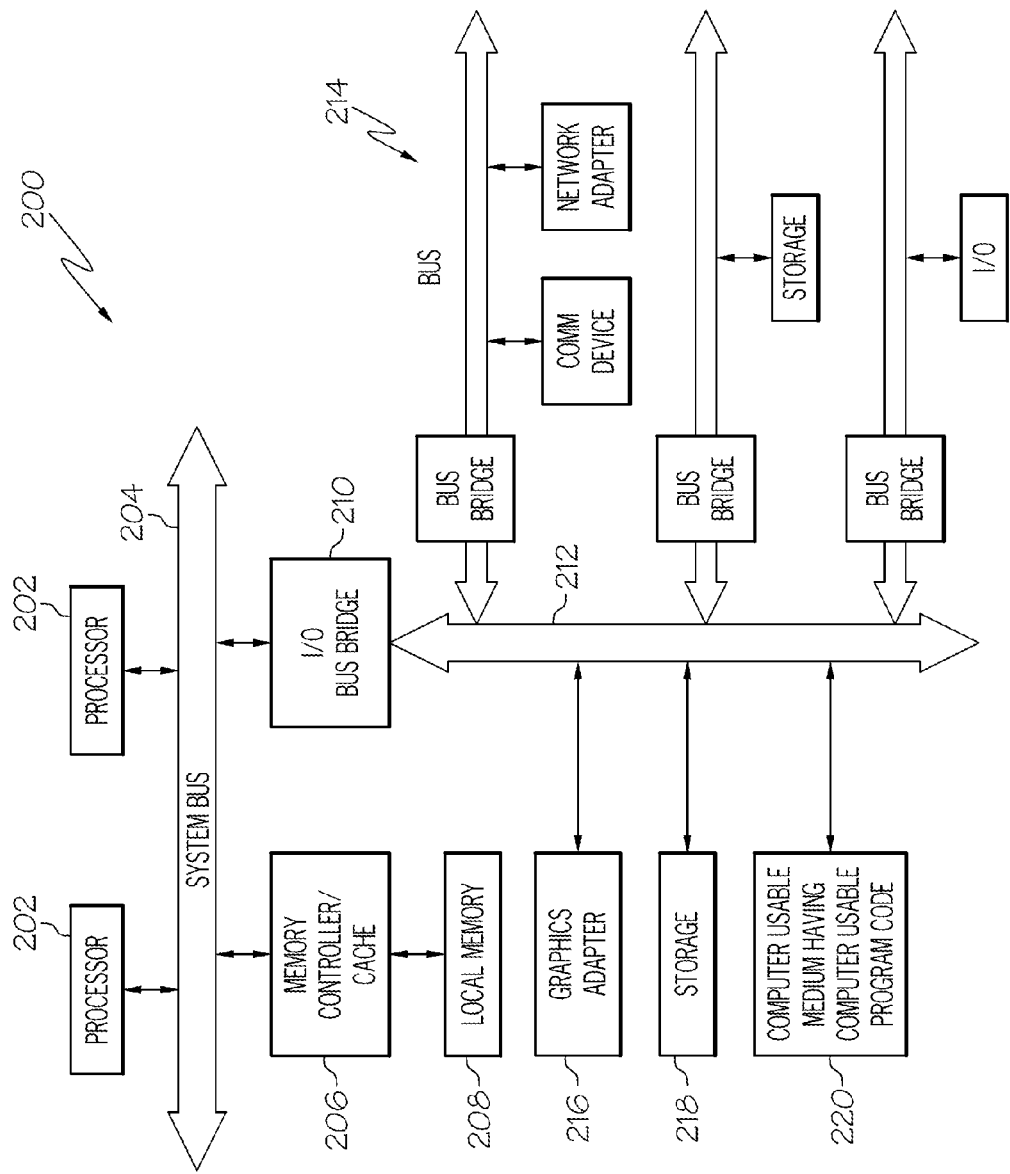
FIG. 6 is a block diagram of an exemplary computer system including a computer usable medium having computer usable program code embodied therewith, where the exemplary computer system is capable of executing a computer program product to provide hierarchical control of a teleconference in a teleconference system according to various aspects of the present invention.

Referring to FIG. 6, a block diagram of a data processing system is depicted in accordance with the present invention. A data processing system 200, such as may be utilized to implement the hierarchical teleconference controller, may comprise a symmetric multiprocessor (SMP) system or other configuration including a plurality of processors 202 connected to system bus 204. Alternatively, a single processor 202 may be employed. Also connected to system bus 204 is memory controller/cache 206, which provides an interface to local memory 208. An I/O bridge 210 is connected to the system bus 204 and provides an interface to an I/O bus 212. The I/O bus may be utilized to support one or more busses and corresponding devices 214, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 216, storage 218 and a computer usable storage medium 220 having computer usable program code embodied thereon. The computer usable program code may be executed to execute any aspect of the present invention, for example, to implement any aspect of any of the methods and/or system components illustrated in FIGS. 1-5. Moreover, the computer usable program code may be utilized to implement the hierarchical control of teleconferences as set out further herein.

The data processing system depicted in FIG. 6 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of controlling a teleconference conducted between two or more participants, comprising:
assigning, by a server of a corresponding teleconference system, a selected one of at least two participation states to each participant in the teleconference, wherein the corresponding teleconference system communicates with a communication device of each participant, wherein:
a first one of the participation states designates a muted state wherein communication from a corresponding participant in the muted state is prevented from reaching the remainder of the teleconference participants over the corresponding teleconference system; and
a second one of the participation states designates an active state wherein communication from a corresponding participant in the active state is transmitted to the remainder of the teleconference participants over the corresponding teleconference system;
monitoring, by the server of the corresponding teleconference system, at least one teleconference parameter associated with the teleconference, each teleconference parameter related to determining whether control of the teleconference should change; and
automatically updating the teleconference without manual intervention when a triggering event is detected based upon monitoring the at least one teleconference parameter by:
determining a hierarchical order of the participants of the teleconference;
modifying a participation state of at least one participant based at least in part upon the determined hierarchical order of the participants; and conveying at least the modified participation state to the corresponding teleconference system so as to implement the modified participation state of the at least one participant of the corresponding teleconference system.

2. The method according to claim 1, wherein determining the hierarchical order of the participants of the teleconference comprises:
deriving a hierarchy based upon a policy or rule that determines whether a first participant can interrupt a designated dominant participant who is the only speaker that reaches the remainder of the teleconference participants over the corresponding teleconference system.

3. The method according to claim 1, wherein determining the hierarchical order of the participants of the teleconference comprises:
deriving an organizational hierarchy from at least one of a lightweight directory access protocol (LDAP) or BluePages, or by deriving a hierarchy based upon a directed acyclic graph.

4. The method according to claim 1, wherein determining the hierarchical order of the participants of the teleconference comprises:
creating a hierarchy by a host of the teleconference.

5. The method according to claim 1, wherein determining the hierarchical order of the participants of the teleconference comprises:
deriving a hierarchy based upon at least one rule or policy specified by at least one of a corresponding organization, individual profiles of the participants or a predetermined set of best practice rules.

6. The method according to claim 1, wherein determining the hierarchical order of the participants of the teleconference comprises:
deriving a hierarchy based upon at least one rule derived from at least one of cultural practice, gender or business practice.

7. The method according to claim 1, wherein determining the hierarchical order of the participants of the teleconference comprises:
establishing the hierarchical order based upon a level of involvement of each participant during the teleconference.

8. The method according to claim 7, wherein the hierarchical order based upon a level of involvement dynamically changes during the teleconference.

9. The method according to claim 1, wherein the hierarchical order automatically dynamically changes at various times during the corresponding teleconference.

10. A method of controlling a teleconference between at least two participants comprising:
monitoring the teleconference, by a server of a corresponding teleconference system, to determine whether more than one participant connected to the corresponding teleconference system by a communication device desires to speak at the same time;
detecting a triggering event based upon monitoring the teleconference;
determining a hierarchical order of participants of the teleconference;
automatically selecting a dominant source without manual intervention based upon the participants desiring to speak and the hierarchical order of the participants;
determining a selected one participant from the at least two participants to have a role of a dominant participant based upon the selected dominant source; and
conveying only the speech of the dominant participant in the teleconference to each participant.

11. The method according to claim 10, wherein at least one participant requests to be the dominant participant by performing at least one of
entering a dual-tone multi-frequency (DTMF) code on their communication device,
speaking into the communication device or
sending a data request to the corresponding teleconference system.

12. The method according to claim 10, further comprising:
providing at least one of a visual or an audible cue to designate a change to the dominant participant.

13. The method according to claim 10, further comprising:
responding to queries from the participants so as to identify the dominant participant.

14. The method according to claim 10, wherein the dominant participant has the right to delegate the role of dominant participant to another participant of the teleconference.

15. The method according to claim 10, further comprising:
utilizing a policy of arbitration among participants desiring to be the dominant participant having similar hierarchical positions.

* * * * *